United States Patent
Nakagawa (10) Patent No.: US 8,437,616 B2
(45) Date of Patent: May 7, 2013

(54) RECORDING SYSTEM (75) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 12/580,191

(22) Filed: Oct. 15, 2009

(65) Prior Publication Data

US 2010/0034524 A1  Feb. 11, 2010

Related U.S. Application Data (63) Continuation of application No. 11/011,312, filed on Dec. 13, 2004, now Pat. No. 7,623,768.

(30) Foreign Application Priority Data

Dec. 26, 2003  (JP) ................................. 2003-434378

(51) Int. Cl.
*H04N 9/80*  (2006.01)

(52) U.S. Cl.
USPC ............................ 386/248; 386/246; 386/326

(58) Field of Classification Search .................. 386/239, 386/248, 326; 378/207.99, 220.1
See application file for complete search history.

(56) References Cited

U.S. PATENT DOCUMENTS

2002/0003576 A1 *  1/2002  Konishi et al. ................ 348/232
2002/0186963 A1 * 12/2002  Toyoda et al. ................ 386/117

\* cited by examiner

*Primary Examiner* — Thai Tran
*Assistant Examiner* — Mishawn Dunn
(74) *Attorney, Agent, or Firm* — Canon USA Inc IP Divison (57) ABSTRACT

A recording system includes an input unit for inputting moving image data, a memory for accumulating the moving image data input by the input unit, a recording unit for recording the moving image data in a recording medium, and a selection unit for selecting either one of a first recording mode and a second recording mode. In the first recording mode, a predetermined amount of the moving image data is accumulated in the memory, is read out from the memory, and is recorded in the recording medium. In the second recording mode, the moving image data is recorded in the recording medium without being accumulated in the memory.

9 Claims, 8 Drawing Sheets

FIG. 7

RECORDING SYSTEM

CROSS-REFERENCE TO RELATED APPLICATIONS

This application is a continuation of U.S. application Ser. No. 11/011,312 filed Dec. 13, 2004, which claims priority from Japanese Patent Application No. 2003-434378 filed Dec. 26, 2003, all of which are hereby incorporated by reference herein in their entirety.

BACKGROUND OF THE INVENTION

1. Field of the Invention

The present invention relates generally to a recording system and, in particular, to a recording system for accumulating image data in a memory and then recording the image data in a recording medium.

2. Description of the Related Art

Digital video disc (DVD) cameras are known in which captured image data are recorded in a DVD in a digital data format. In order to protect against shock and to reduce power consumption at recoding time, Japanese Patent Laid-Open No. 6-52636 discloses a recording system in which captured moving image data is buffered in a built-in image memory and the buffered image data is recorded into a disk after a predetermined amount of image data is accumulated in the image memory.

In general, image data for a duration of several seconds to several tens of seconds is buffered. The duration for the buffered image data varies depending on the capacity of the built-in memory and recording speed (rate) of the recording medium.

For example, if image data of 10 seconds is recorded into a disk after being stored in a memory, image data for 300 frames is buffered in the NTSC standard.

Additionally, when image data is recorded in a disk medium and is played back from the disk medium, the pickup head which reads and writes the image data is precisely controlled in order to align the position (tracking). For example, if the head position is offset due to an impact force on the system, a re-tracking of the head is needed. This may cause recording failure or play back failure if the re-tracking occurs many times.

Consequently, to ensure the stability of recoding and playing back, a predetermined amount of image data is buffered in the built-in memory and the buffered data is recorded in a disk in a short time when recording, while a predetermined amount of bulk image data is played back from the disk in a short time, is buffered in the built-in memory, is read out, and is output when playing back.

Among such video cameras, some have an interval recording function that captures image data for a predetermined duration at predetermined intervals as well as normal recording functions.

More specifically, the interval recording function repeatedly captures image data for a predetermined duration, for example, a duration of several frames, at predetermined intervals, for example, intervals of several minutes. Some video cameras allow a user to freely set up a shot-to-shot interval, a recording time for one shot, and also a duration in which a re-recording is executed (i.e. the number of repetitions).

The interval recording is suitable for recording changes in a subject that take a long time by using a video camera that is mounted on a tripod and in which the field angle remains constant. For example, it is suitable for shooting changes when a flower is opening up.

However, when, as described above, a predetermined amount of image data is recorded in a disk after being buffered in a memory, the following problem occurs in the interval recording.

Assuming that 2 frames are captured at one shot and 300 frames of image data can be stored in a memory, image data for 150 shots can be buffered. That is, 300 frames/2 frames=150.

Accordingly, if a recording interval is 1 minute, the image data stored in the buffer memory is recorded in a disk at intervals of 150 minutes.

During interval recording, the total shooting time frequently becomes long since a change in a subject for a long time must be shot at predetermined intervals. For example, the opening of a flower sometimes requires several tens of hours.

Since the shooting requires a long period of time, it is difficult for a user to monitor the state of the system at all times. And when the camera uses a battery, the camera may stop functioning due to a drop in driving voltage supplied to the system. If the recording is carried out using an AC power supply, the recording may also stop due to power blackout.

In these cases, the driving power supply that operates the system is lost. Therefore, not only is the image data stored in the memory not recorded in the disk, the buffered image data is cleared.

For example, in the above-described conditions, the image data captured by the interval recording during a maximum of 150 minutes, that is, the 10-second image data to be recorded is discarded without being recorded in the disk.

Thus, in the interval recording, when the recording system becomes inoperable due to, for example, power blackout or shut-off of power supply to the recording system, image data captured before the shut-off may not be recorded.

SUMMARY OF THE INVENTION

Among other advantages, the recording system of the present invention is capable of reliably recording image data captured in advance even when the power supply to the recording system is shut off.

According to the present invention, a recording system includes input means for inputting moving image data, a memory for accumulating the moving image data input by the input means, recording means for recording the moving image data in a recording medium, and selection means for selecting either one of a first recording mode and a second recording mode, wherein, in the first recording mode, a predetermined amount of the moving image data is accumulated in the memory, is read out from the memory, and is recorded in the recording medium and, in the second recording mode, the moving image data is recorded in the recording medium without being accumulated in the memory.

According to the present invention, a recording system includes input means for inputting moving image data, a volatile memory for storing the moving image data input by the input means, a nonvolatile memory for storing the moving image data input by the input means, recording means for recording the moving image data in a recording medium, and selection means for selecting either one of a first recording mode, a second recording mode, and a third recording mode. In the first recording mode, the moving image data is accumulated in the volatile memory, is read out from the volatile memory, and is recorded in the recording medium. In the second recording mode, the moving image data is recorded in the recording medium without being accumulated in the volatile memory and the nonvolatile memory. In the third recording mode, the moving image data is stored in the nonvolatile memory, is read out from the nonvolatile memory, and is recorded in the recording medium.

According to the present invention, a recording system includes input means for inputting moving image data, a memory for storing the moving image data input by the input means, recording means for reading out the moving image data stored in the memory and recording the moving image data in a recording medium, and selection means for selecting either one of a first recording mode and a second recording mode. In the first recording mode, every time the moving image data for M frames is accumulated in the memory, the moving image data for M frames is read out from the memory to be recorded in the recording medium. In the second recording mode, every time the moving image data for N frames is accumulated in the memory, the moving image data for N frames is read out from the memory to be recorded in the recording medium, where M>N.

According to the present invention, a recording method for a recording system including a memory for storing input moving image data and recording means for recording the moving image data in a recording medium, the method includes a selection process step for selecting either one of a first recording mode and a second recording mode. In the first recording mode, a predetermined amount of the moving image data is accumulated in the memory, is read out from the memory, and is recorded in the recording medium and, in the second recording mode, the moving image data is recorded in the recording medium without being accumulated in the memory.

According to the present invention, a recording method for a recording system including a memory for storing input moving image data and recording means for recording the moving image data in a recording medium, the method includes a selection process step for selecting either one of a first recording mode and a second recording mode. In the first recording mode, every time the moving image data for M frames is accumulated in the memory, the moving image data for M frames is read out from the memory to be recorded in the recording medium and, in the second recording mode, every time the moving image data for N frames is accumulated in the memory, the moving image data for N frames is read out from the memory to be recorded in the recording medium, where M>N.

Further features and advantages of the present invention will become apparent from the following description of the embodiments with reference to the attached drawings.

DETAILED DESCRIPTION OF THE EMBODIMENTS

First Embodiment

Figure 1:
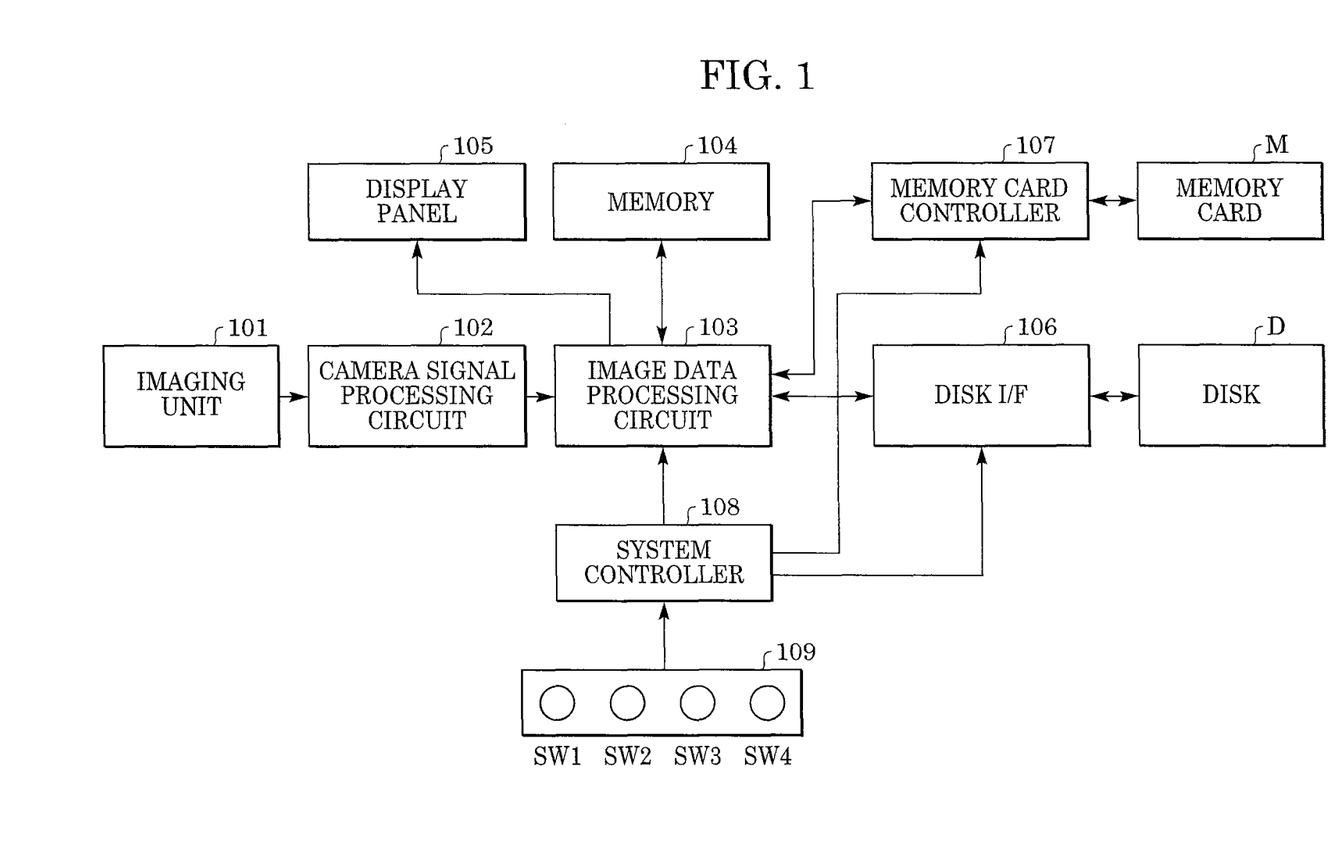
FIG. 1 is a block diagram of a recording system according to an embodiment of the present invention.

FIG. 1 is a block diagram of a recording system according to an embodiment of the present invention.

In FIG. 1, an imaging unit 101 converts a subject image to image data. A camera signal processing circuit 102 carries out well-known image processing on the image data captured by the imaging unit 101. An image data processing circuit 103 encodes the image data output from the camera signal processing circuit 102 into MPEG data when recording. A memory 104 for storing the image data is used for the encoding process by the image data processing circuit 103 and is also used as a buffer memory when recording an image. The memory 104 is a volatile memory, such as a synchronous dynamic random access memory (SDRAM), and stored image data is cleared by powering off the system.

A display panel 105 displays a subject image output from the imaging unit 101 via the image data processing circuit 103. A disk interface (I/F) 106 records image data in a disk D and plays back the image data from the disk D. A memory card controller 107 writes image data in a memory card M and reads out the image data from the memory card M. A system controller 108 controls the operations of the above-described units. An operation unit 109 includes switches SW1 to SW4. The system controller 108 includes a microcomputer and various types of registers.

In FIG. 1, an image captured by the imaging unit 101 is focused on a CCD through a lens system and is converted to an image signal, which is converted into image data based on a predetermined process by the camera signal processing circuit 102. The image data is then output to the image data processing circuit 103. The image data processing circuit 103 outputs the image data to display it on the display panel 105, and also stores the image data in the memory 104. Then, the image data processing circuit 103 encodes the image data stored in the memory 104 and stores it in the memory 104 again.

In a normal recording mode, upon accumulating (buffering) a predetermined amount of the encoded image data in the memory 104, the image data processing circuit 103 outputs the predetermined amount of the encoded image data to the disk I/F 106. The disk I/F 106 records the predetermined amount of the encoded image data output from the image data processing circuit 103 into the disk D.

In this embodiment, upon accumulating an amount of image data corresponding to a predetermined number of frames at 5 Mbps data rate, for example, 300 frames, in the memory 104, the image data accumulated in the memory 104 is output to the disk I/F 106. As noted, the memory 104 is capable of storing more than 300 frames to protect against any shock encountered during recording.

Thus, in the normal recording mode, every time a predetermined amount of image data is accumulated in the memory 104, the disk I/F 106 records the image data in the disk D.

Figure 2:
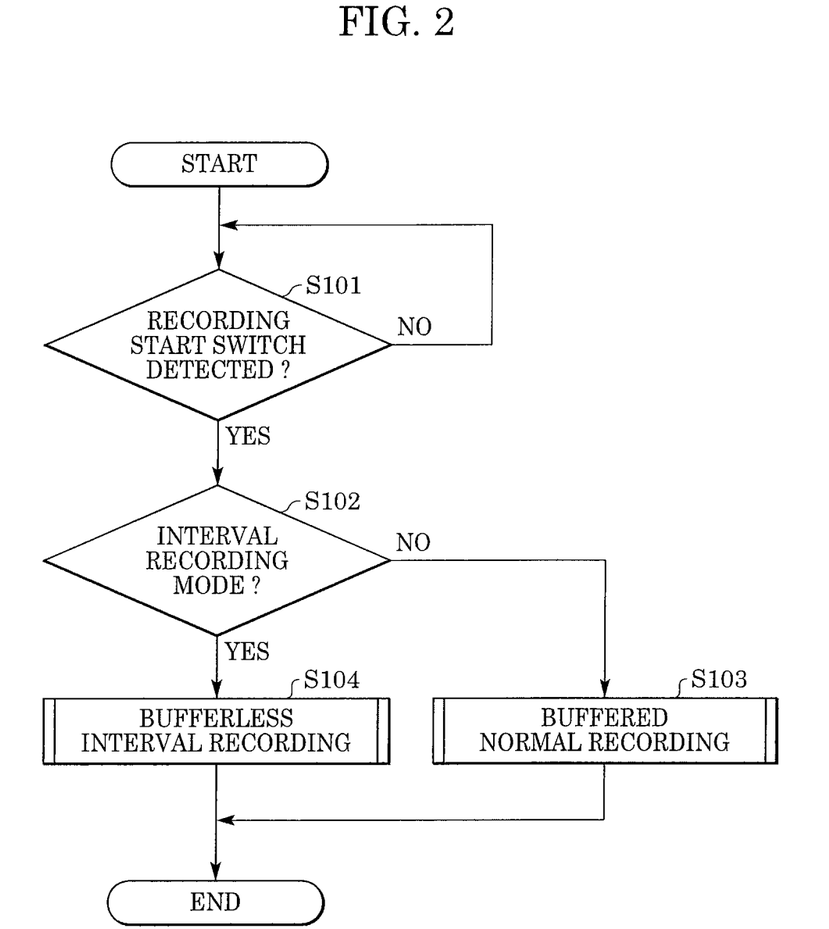
FIG. 2 is a flow chart of a recording operation according to a first embodiment of the present invention.

FIG. 2 is a flow chart illustrating the control of a recording operation of the system controller 108 of FIG. 1. This procedure is carried out by a microcomputer. The operation of the recording system shown in FIG. 1 will be described below with reference to the flow chart.

At step S101, it is determined whether the recording start and stop switch SW1 is ON or OFF. If the switch SW1 is ON, the process proceeds to step S102 so as to enter a recording process. If the switch SW1 remains OFF, the process stays at step S101.

Subsequently, at step S102, it is determined whether the system is in a normal recording mode or in an interval recording mode. Here, the recording mode is set by a user in advance via recording condition setting means, such as a menu selection interface. If the determination at step S102 indicates that it is in a normal recording mode, the process proceeds to step S103. If it is in an interval recording mode, the process branches to step S104.

At step S103, a normal recording process (buffered normal recording process) is carried out. That is, captured data is recorded while being buffered in the memory. At step S104, an interval recording process (bufferless interval recording process) is carried out. That is, the captured data is recorded without being buffered in the memory.

Figure 3:
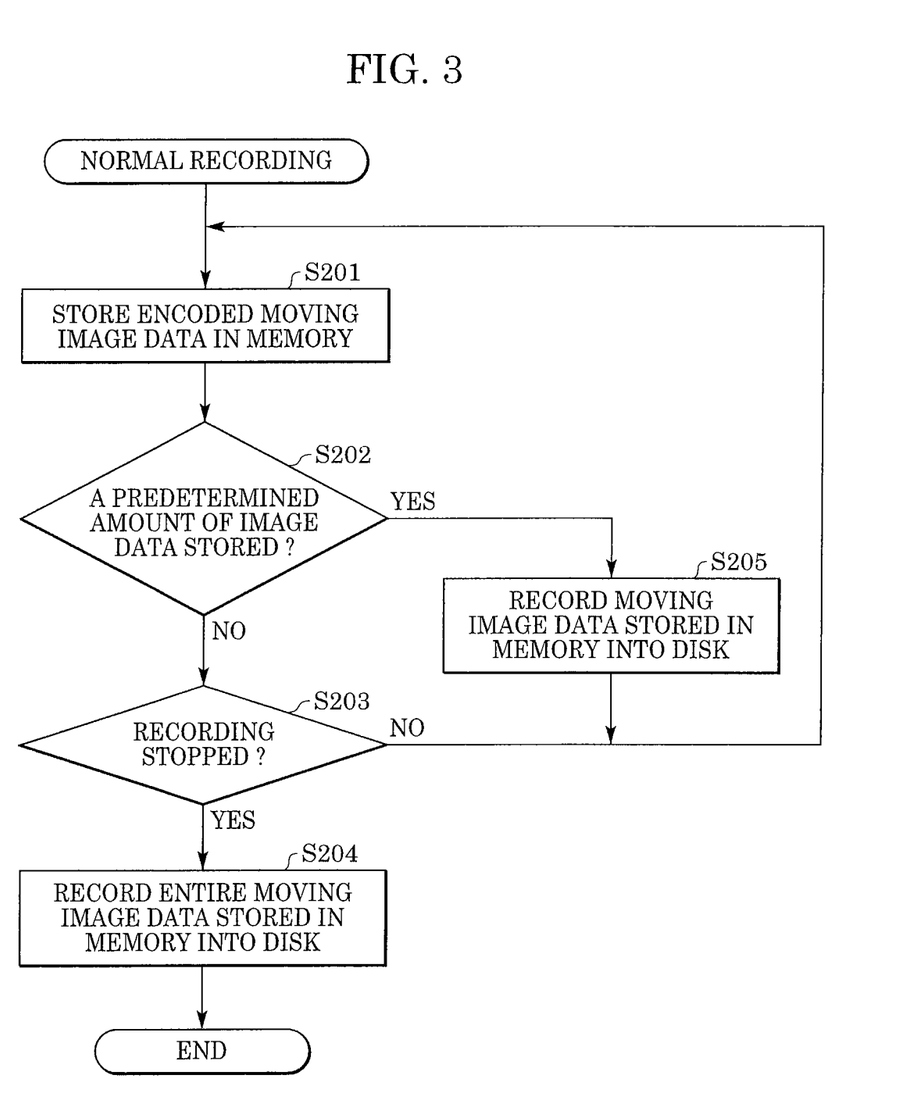
FIG. 3 is a flow chart of a buffered normal recording process according to an embodiment of the present invention.
Figure 4:
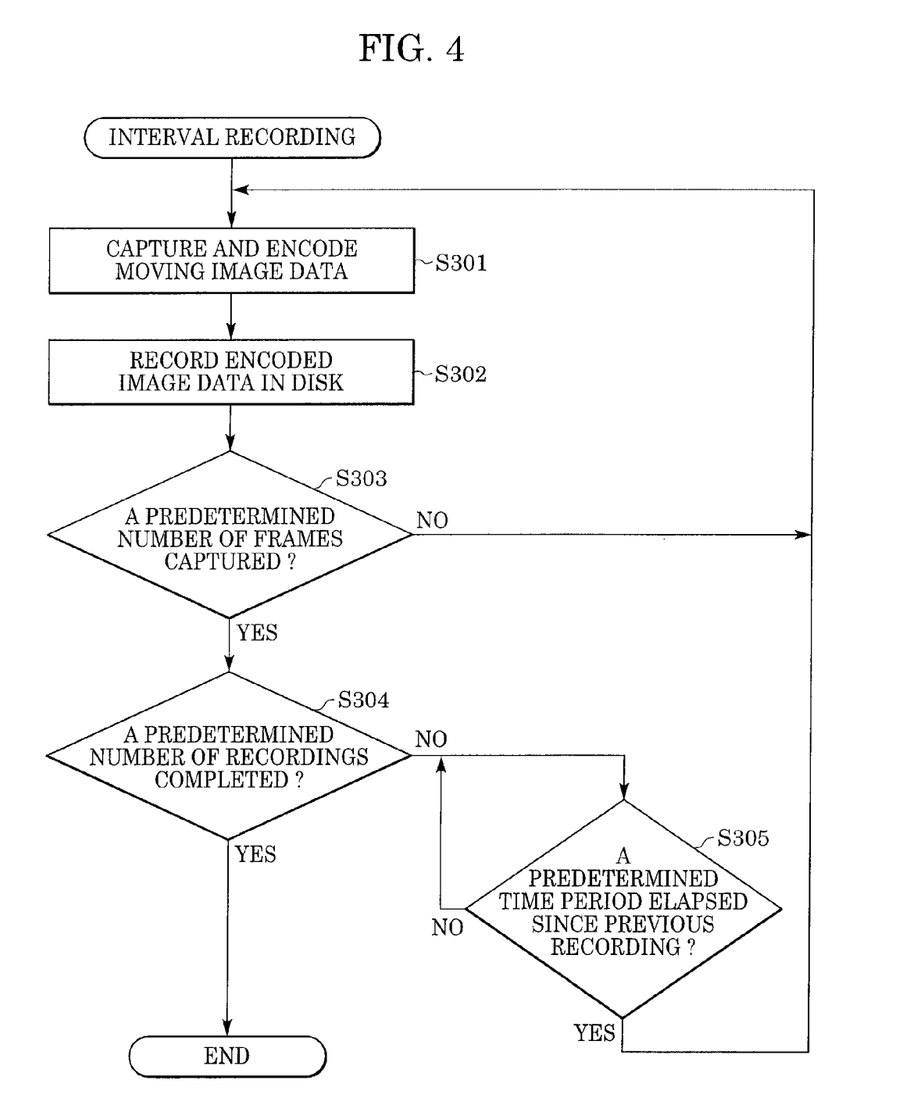
FIG. 4 is a flow chart of a bufferless interval recording process according to an embodiment of the present invention.

These recording processes will be described below with reference to flow charts shown in FIGS. 3 and 4.

The operation of the normal recording process will be described next with reference to FIG. 3.

First, as described above, encoded image data is accumulated in the memory 104 (step S201) and it is then determined whether a predetermined amount of image data, here, image data corresponding to 300 frames, for example, is accumulated in the memory 104 (step S202). If it has not been accumulated, it is determined whether the switch SW1 has been turned off to stop recording (203). If the switch SW1 has been turned off, the entire image data buffered in the memory 104 is read out and recorded in the disk (step S204). After the image data is recorded in the disk D, the image data buffered in the memory 104 is cleared.

On the other hand, if, at step S202, the predetermined amount of image data has been accumulated in the memory 104, the image data buffered in the memory 104 is read out and recorded in the disk D (step S205). This operation is repeated until recording is stopped at step S203.

The operation in an interval recording mode will be described next with reference to the flow chart shown in FIG. 4. Here, the number of frames taken in one shot, the total number of shots, and a shot-to-shot interval are set by a user in advance via the recording condition setting means, such as a menu selection.

First, moving image data is captured and encoded (step S301). The encoded image data is then recorded in the disk D (step S302). In this case, the writing operation is carried out even when the state of the disk D is unstable and is not suitable for writing data.

Then, it is determined whether image data of a predetermined number of frames captured in one shot is written in the disk D (step S303). If the predetermined number of frames has been recorded in the disk D, it is determined whether a predetermined number of interval recordings are completed (step S304). If it is completed, the interval recording is completed.

In contrast, if the predetermined number of interval recordings is not completed, it is determined whether a predetermined time period has elapsed since the previous shooting and recording (step S305). If so, the process returns to step S301 and the above-described processes are repeated.

As described above, according to this embodiment, when carrying out an interval recording, image data of a predetermined number of frames is written in the disk D without the image data being buffered in the memory 104. Thus, a method for interval recording can be provided in which previously captured data to be recorded is reliably recorded in a recording medium even when power blackout occurs during recording time or even when the system becomes inoperable due to a drop in driving voltage.

Second Embodiment

In a second embodiment, the configuration of a recording system is identical to that shown in FIG. 1.

Figure 5:
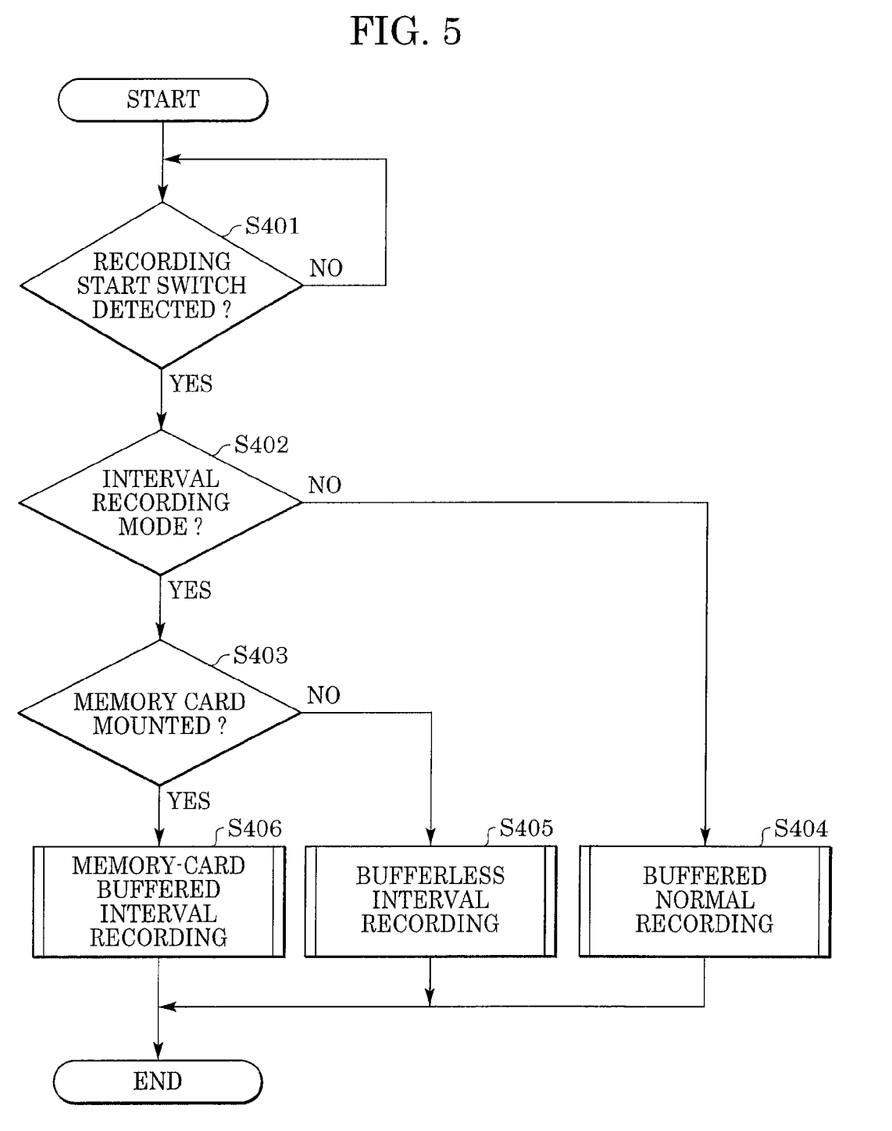
FIG. 5 is a flow chart of a recording operation according to a second embodiment of the present invention.

FIG. 5 is a flow chart illustrating a recording operation of the system controller 108 shown in FIG. 1 according to the second embodiment.

In FIG. 5, at step S401, recording is initiated. At step S402, it is determined whether the system is in a normal recording mode or in an interval recording mode. If it is in a normal recording mode, the process proceeds to step S404. If it is in an interval recording mode, the process branches to step S403.

At step S403, it is determined whether a memory card M is mounted. If the memory card M is mounted, the process proceeds to step S406. Otherwise, the process branches to step S405.

At step S404, a normal recording process is carried out, in which captured data is buffered in a memory. At step S405, an interval recording process is carried out, in which a buffer is not used. Since the recording processes are identical to those in the first embodiment, descriptions thereof are not included here.

When the process proceeds to step S406, an interval recording process (memory-card buffered interval recording) is carried out, in which captured image data is recorded while the image data is buffered in the memory card M.

Figure 6:
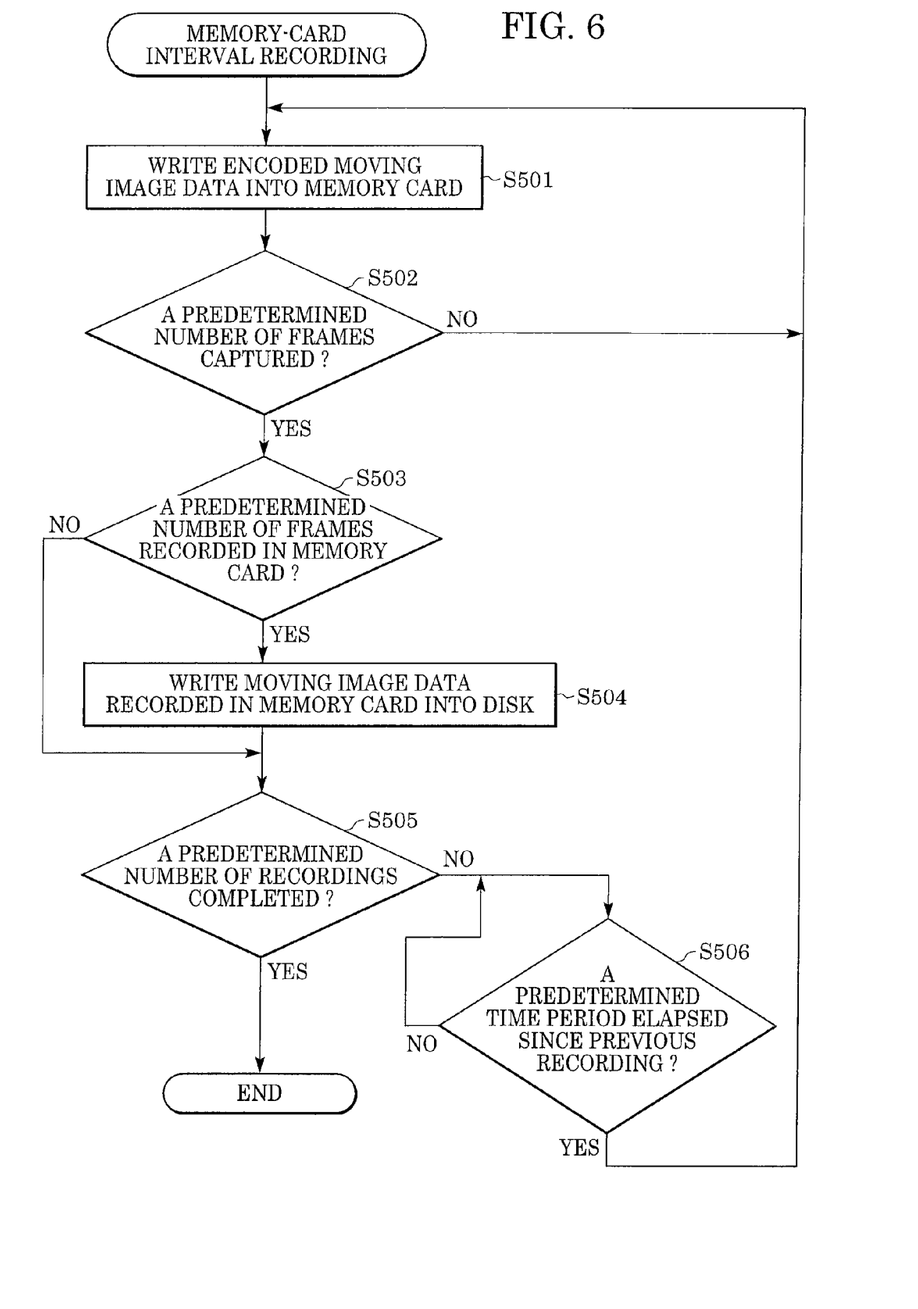
FIG. 6 is a flow chart of a memory-card buffered interval recording process according to an embodiment of the present invention.

The memory-card buffered interval recording at step S406 will be described next with reference to the flow chart shown in FIG. 6.

First, a memory card controller 107 starts to write encoded moving image data into the memory card M (step S501) Then, it is determined whether frames captured during one shot are recorded in the memory card M (step S502). If a predetermined number of frames have been recorded, the process proceeds to step S503. Otherwise, the process returns to step S501, where the recording process is carried out again.

Subsequently, the number of frames of data recorded in the memory card M is determined. If a predetermined number of frames, image data for 300 frames in this case, are recorded in the memory card M, the process branches to step S504. Otherwise, the process proceeds to step S505.

At step S504, the data of 300 frames recorded in the memory card M is written into the disk D. The writing process is carried out only when the disk D is in a state in which data can be stably written. The written data is cleared from the memory card M. Then, the process proceeds to step S505 without waiting for the start of the writing into the disk D.

At step S505, it is determined whether a predetermined number of recordings are completed. If a predetermined number of recordings are carried out, the recording is completed. Otherwise, the process branches to step S506.

At step S506, it is determined whether a predetermined time period has elapsed since the previous recording. If the predetermined time period has elapsed, the process returns to step S501 and the next recording process is continuously carried out.

As described above, according to this embodiment, even in the interval recording mode, when the memory card M is mounted, image data can be written into the disk D in a stable state by buffering the image data using the memory card M. Additionally, even when power blackout occurs during a recording time or when the system becomes inoperable due to a drop in driving voltage, recording data captured before the events is saved in the memory card M, thus preventing loss of image data captured before the system becomes inoperable.

In this embodiment, the number of frames to be buffered is 300. However, the number may be any other number.

Third Embodiment

In a third embodiment, the configuration of a recording system is also identical to that shown in FIG. 1.

Figure 7:
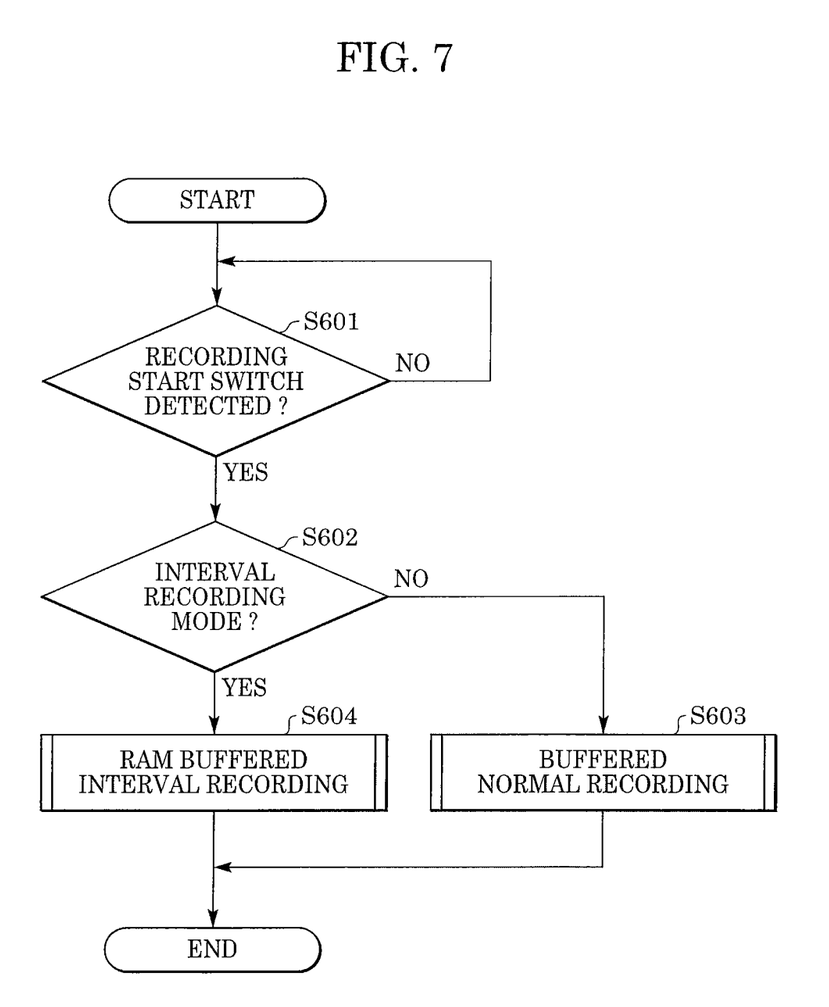
FIG. 7 is a flow chart of a recording operation according to a third embodiment of the present invention.

FIG. 7 is a flow chart illustrating a recording operation of the system controller 108 according to the third embodiment. The recording operation according to the third embodiment will be described next with reference to the flow chart.

When recording is initiated via switch SW1 (step S601), it is determined whether the system is in a normal recording mode or in an interval recording mode (step S602). If it is in a normal recording mode, the process proceeds to step S603. If it is in an interval recording mode, the process branches to step S604.

At step S603, a normal recording process is carried out, in which captured data is buffered in a memory. This buffered normal recording process is identical to that in the first embodiment.

On the other hand, if the process proceeds to step S604, an interval recording process (RAM buffered interval recording process) is carried out, in which captured image data is buffered in a memory.

Figure 8:
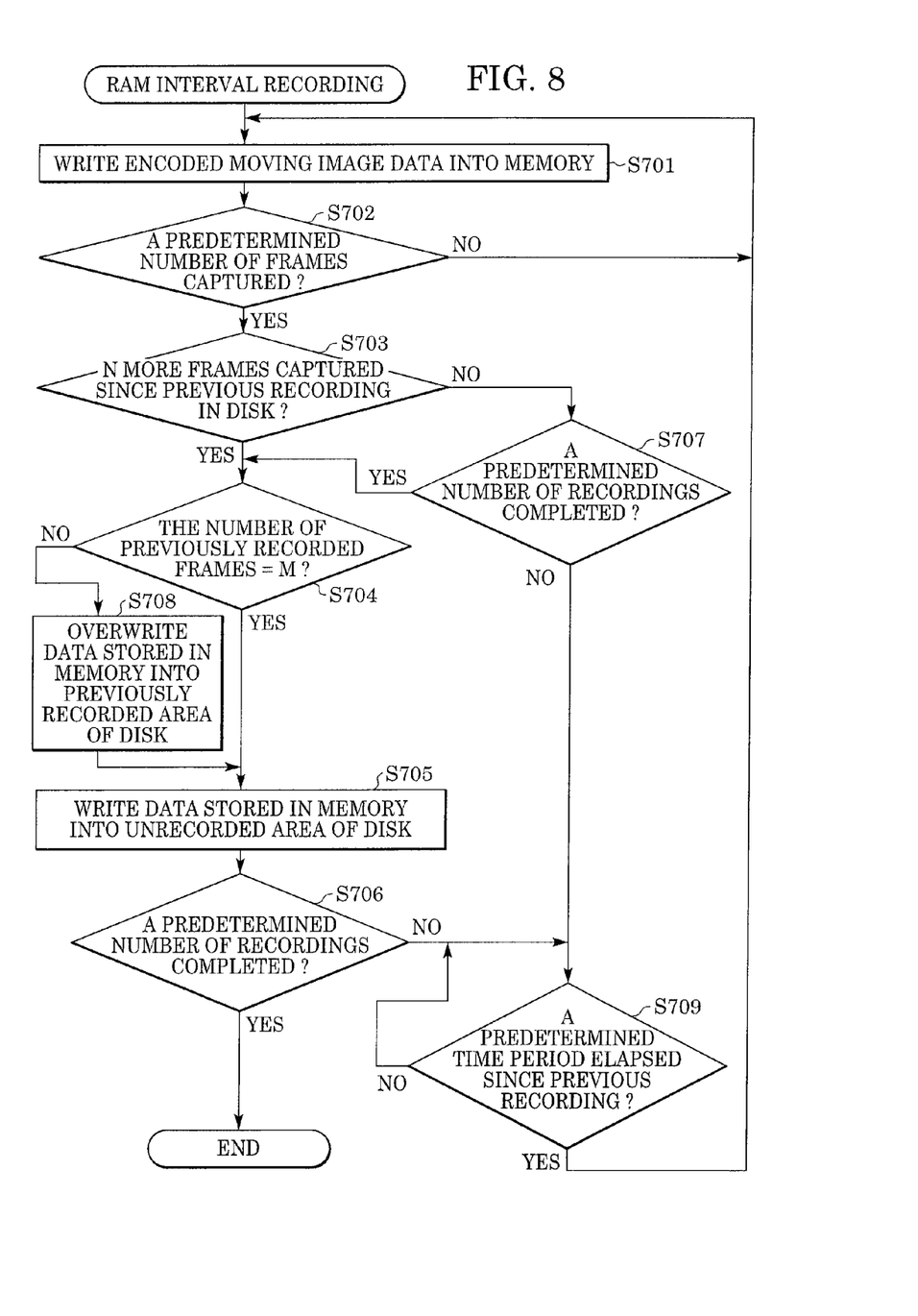
FIG. 8 is a flow chart of a RAM buffered interval recording process according to an embodiment of the present invention.

The operation of the RAM buffered interval recording will be described next with reference to a flow chart shown in FIG. 8.

First, an image is captured as described above, and encoded image data is buffered in a memory 104 (step S701). Then, it is determined whether all the frames to be captured for one shot are captured (step S702). If a predetermined number of frames have been captured, the process proceeds to step S703. Otherwise, the process returns to step S701, where the recording process is carried out again.

Subsequently, at step S703, it is determined whether N more frames, 60 frames in this example, are captured since the previous writing of image data in disk D, and are buffered in the memory 104. If more than or equal to N frames are captured, the process proceeds to step S704. Otherwise, the process branches to step S707. Here, the number of frames N used for the determination must be smaller than the number of frames buffered in a normal recording mode, that is, 300 frames in this example.

At step S707, it is determined whether a predetermined number of recordings are completed. If a predetermined number of recordings are completed, the process proceeds to step S704. Otherwise, the process branches to step S709.

At step S704, it is determined whether the number of frames previously recorded in the disk D is equal to or more than M (300 in this example). If so, the process proceeds to step S705. Otherwise, the process branches to step S708.

At step S705, image data for M frames buffered in the memory 104 is written in an unrecorded area of the disk D. The writing process is carried out only when the disk D is in a stable state in which data can be written. The written data is cleared from the memory 104. Then, the process proceeds to step S706 without waiting for the start of the writing into the disk D.

At step S708, the image data buffered in the memory 104 is overwritten on the previously recorded area of the disk D. At this time, the image data buffered in the memory 104 is not cleared and remains there. Then, the process proceeds to step S705 without waiting for the start of the writing into the disk D.

At step S706, it is determined whether a predetermined number of recordings are completed. If a predetermined number of recordings are carried out, the recording is completed. Otherwise, the process branches to step S709.

On the other hand, at step S709, it is determined whether a predetermined time period has elapsed since the previous recording. If the predetermined time period has elapsed, the process returns to step S701 and the next recording process is continuously carried out. Otherwise, the process stays at step S709 and continues to determine whether the predetermined time period has elapsed.

As described above, according to this embodiment, even in the interval recording mode, when image data for N frames, which is smaller than M frames buffered in a normal recording mode, is buffered, the image data can be overwritten into the disk D. This can minimize loss of the image data even when power blackout occurs during a recording time or even when the system becomes inoperable due to a drop in driving voltage. Also, this allows the image data to be written at the time when the disk D is in a stable writing state.

Additionally, in the above-described embodiments, the number of frames buffered before being written in the disk D is 300 in a normal recording mode, and is 60 in an interval recording mode. The number of frames herein provided is for exemplary purposes only.

Other Embodiments

The present invention includes embodiments in which various types of devices operate so as to achieve the functions of the above-described embodiments by supplying a program code of software that achieves such functions to a computer in a system connected to the various types of devices and executing the program stored in the computer (CPU or MPU) of the system.

In such a case, the program code of the software achieves the functions of the above-described embodiments by itself. That is, the program code itself and means for supplying the program code to the computer, for example, a recording medium storing the program code achieves the present invention. The recording medium for storing the program code includes, for example, a flexible disk, a hard disk, an optical disk, a magneto optical disk, a CD-ROM, a magnetic tape, a nonvolatile memory card, and a ROM.

Additionally, in addition to achieving the functions of the above-described embodiments by the computer executing the supplied program, the embodiments of the present invention include the program code that achieves the functions of the above-described embodiments in corporation with an operating system (OS) or other application software running on the computer.

Furthermore, the embodiments of the present invention include the program code that achieves the functions of the above-described embodiments by a process in which, after the supplied program is stored in a memory of an add-on expansion board in the computer or is stored in a memory of an add-on expansion unit connected to the computer, a CPU in the add-on expansion board or in the add-on expansion unit executes some of or all functions of the above-described embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
   an imaging unit;
   a memory configured to store moving image data obtained by the imaging unit;
   a recording unit configured to record the moving image data in a recording medium;
   a mode selection unit configured to select either one of a first recording mode and a second recording mode,
   wherein, in the first recording mode, in a state in which moving image data of a first predetermined amount is stored in the memory, the moving image data of the first predetermined amount is read out from the memory, and is recorded in the recording medium and, in the second recording mode, in a state in which the moving image data of a second predetermined amount smaller than the first predetermined amount is stored in the memory, the moving image data of the second predetermined amount is read out from the memory, and is recorded in the recording medium, and
   wherein, in an interval recording mode for intermittently recording the moving image data for a predetermined number of frames in the recording medium at predetermined intervals, the selection unit selects the second recording mode.

2. An apparatus according to claim 1, wherein, in the interval recording mode, the imaging unit outputs the moving image data for the predetermined number of frames at the predetermined intervals.

3. An apparatus according to claim 1, wherein, in the interval recording mode, the recording stops recording the moving image data after a completion of a predetermined times of the recording of the moving image data for the predetermined number of frames by the imaging unit.

4. An apparatus according to claim 1, further comprising:
   a receiving unit that receives a photographing start instruction and a photographing stop instruction,
   wherein, in a normal recording mode, the recording unit reads out the moving image data from the memory and records the moving image data in the recording medium every time the first predetermined amount of the moving image data is stored in the memory between the photographing start instruction and the photographing stop instruction.

5. An imaging apparatus comprising:
   an imaging unit;
   a memory configured to store moving image data obtained by the imaging unit;
   a recording unit configured to record the moving image data in a recording medium; and
   a mode selecting unit configured to select either one of a first recording mode and a second recording mode,
   wherein, in the first recording mode, in a state in which the moving image data of a first amount is stored in the memory, the moving image data of the first amount is read out from the memory and is recorded in the recording medium and, in the second recording mode, in a state in which the moving image data of a second amount, which is smaller than the first amount, corresponding to a predetermined number of frames is stored in the memory, the moving image data of the second amount is read from the memory and is recorded in the recording medium, and
   wherein, in an interval recording mode for intermittently recording the moving image data for the predetermined number of frames in the recording medium at predetermined intervals, the selection unit selects the second recording mode.

6. An apparatus according to claim 5, wherein, in the interval recording mode, the recording unit stops recording the moving image data after a completion of a predetermined times of the photographing of the predetermined number of frames of the moving image data by the imaging unit.

7. An apparatus according to claim 5, further comprising:
   a receiving unit that receives a photographing start instruction and a photographing stop instruction,
   wherein, in a normal recording mode, the recording unit reads out the moving image data from the memory and record the moving image data in the recording medium every time the first amount of the moving image data is stored in the memory between the photographing start instruction and the photographing stop instruction.

8. A recording method comprising:
   storing in a memory moving image data obtained by an imaging unit;
   recording the moving image data in a recording medium; and
   selecting one of a first recording mode and a second recording mode,
   wherein, in the first recording mode, in a state in which moving image data of a first predetermined amount is stored in the memory, the moving image data of the first predetermined amount is read out from the memory, and is recorded in the recording medium and, in the second recording mode, in a state in which the moving image data of a second predetermined amount smaller than the first predetermined amount is stored in the memory, the moving image data of the second predetermined amount is read out from the memory, and is recorded in the recording medium, and
   wherein, in an interval recording mode for intermittently recording in the recording medium the moving image data for a predetermined number of frames obtained by the imaging unit at predetermined intervals, the step of selecting selects the second recording mode.

9. A recording method comprising:
   storing in a memory moving image data obtained by an imaging unit;
   recording the moving image data in a recording medium; and
   selecting either one of a first recording mode and a second recording mode, wherein, in the first recording mode, in a state in which moving image data of a first amount is stored in the memory, the moving image data of the first amount is read out from the memory and is recorded in the recording medium and, in the second recording mode, in a state in which the moving image data of the second amount, which is smaller than the first amount, corresponding to a predetermined number of frames is stored in the memory, the moving image data of the second amount is read out from the memory and is recorded in the recording medium, and
   wherein, in an interval recording mode for intermittently recording in the recording medium the moving image data for the predetermined number of frames obtained by the imaging unit at predetermined intervals, the step of selecting selects the second recording mode.

* * * * *